US010200492B2

(12) United States Patent
MacCarthaigh et al.

(10) Patent No.: US 10,200,492 B2
(45) Date of Patent: *Feb. 5, 2019

(54) REQUEST ROUTING PROCESSING

(71) Applicant: Amazon Technologies, Inc., Seattle, WA (US)

(72) Inventors: Colm MacCarthaigh, Seattle, WA (US); David R. Richardson, Seattle, WA (US); Benjamin W.S. Redman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,205

(22) Filed: Mar. 26, 2018

(65) Prior Publication Data

US 2018/0213052 A1   Jul. 26, 2018

Related U.S. Application Data

(63) Continuation of application No. 14/629,433, filed on Feb. 23, 2015, now Pat. No. 9,930,131, which is a
(Continued)

(51) Int. Cl.
*H04L 29/08* (2006.01)
*H04L 12/26* (2006.01)
(Continued)

(52) U.S. Cl.
CPC .... *H04L 67/2833* (2013.01); *H04L 29/08288* (2013.01); *H04L 43/16* (2013.01);
(Continued)

(58) Field of Classification Search
CPC ......... H04L 29/08288; H04L 29/12066; H04L 43/16; H04L 45/72; H04L 61/1511;
(Continued)

(56) References Cited

U.S. PATENT DOCUMENTS 7,937,477 B1 * 5/2011 Day ..................... G06Q 20/401
709/227
8,209,695 B1   6/2012 Pruyne et al.
(Continued)

FOREIGN PATENT DOCUMENTS

CA   2741 895 A1   5/2010
CN   1422468 A   6/2003
(Continued)

OTHER PUBLICATIONS

Office Action in Application No. 09729072.0 dated May 14, 2018.
(Continued)

*Primary Examiner* — Kostas J Katsikis
(74) *Attorney, Agent, or Firm* — Knobbe Martens Olson & Bear LLP

(57) ABSTRACT

Generally described, the present disclosure is directed to managing request routing functionality corresponding to resource requests for one or more resources associated with a content provider. The processing of the DNS requests by the service provider can include the selective filtering of DNS queries associated with a DNS query-based attack. A service provider can assign DNS servers corresponding to a distributed set of network addresses, or portions of network addresses, such that DNS queries exceeding a threshold, such as in DNS query-based attacks, can be filtered in a manner that can mitigate performance impact on for the content provider or service provider.

10 Claims, 8 Drawing Sheets

Related U.S. Application Data continuation of application No. 13/873,040, filed on Apr. 29, 2013, now Pat. No. 9,003,040, which is a continuation of application No. 12/952,118, filed on Nov. 22, 2010, now Pat. No. 8,452,874.

(51) Int. Cl.
  *H04L 12/721* (2013.01)
  *H04L 29/06* (2006.01)
  *H04L 29/12* (2006.01)

(52) U.S. Cl.
  CPC .......... *H04L 45/72* (2013.01); *H04L 61/3025* (2013.01); *H04L 63/1458* (2013.01); *H04L 67/1036* (2013.01); *H04L 29/12066* (2013.01); *H04L 61/1511* (2013.01); *H04L 2463/142* (2013.01)

(58) Field of Classification Search
  CPC .............. H04L 61/3025; H04L 63/1458; H04L 67/1036; H04L 67/2833; H04L 2463/142
  See application file for complete search history.

(56) References Cited

U.S. PATENT DOCUMENTS

| | | |
|---|---|---|
| 8,949,161 B2 | 2/2015 | Borst et al. |
| 9,276,812 B1 | 3/2016 | Nagargadde et al. |
| 9,645,808 B1 | 5/2017 | Turpie |
| 9,703,713 B2 | 7/2017 | Nadgowda |
| 9,760,420 B1 | 9/2017 | Letz et al. |
| 9,811,451 B1 | 11/2017 | Arguelles et al. |
| 9,819,567 B1 | 11/2017 | Uppal et al. |
| 9,832,141 B1 | 11/2017 | Raftery |
| 9,871,794 B2 | 1/2018 | Joffe et al. |
| 9,887,914 B2 | 2/2018 | Bergman |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,912,740 B2 | 3/2018 | Richardson et al. |
| 9,929,959 B2 | 3/2018 | Mostert |
| 9,930,131 B2 | 3/2018 | MacCarthaigh et al. |
| 9,954,934 B2 | 4/2018 | Sivasubramanian et al. |
| 9,985,927 B2 | 5/2018 | Richardson et al. |
| 9,992,086 B1 | 6/2018 | Mizik et al. |
| 9,992,303 B2 | 6/2018 | Richardson et al. |
| 10,015,237 B2 | 7/2018 | Richardson et al. |
| 10,015,241 B2 | 7/2018 | Marr et al. |
| 10,021,179 B1 | 7/2018 | Velummylum et al. |
| 10,027,582 B2 | 7/2018 | Richardson et al. |
| 10,033,627 B1 | 7/2018 | Howard et al. |
| 10,033,691 B1 | 7/2018 | Mizik et al. |
| 10,049,051 B1 | 8/2018 | Baldwin |
| 2001/0052016 A1* | 12/2001 | Skene ................ G06F 9/505 709/226 |
| 2002/0112123 A1 | 8/2002 | Becker et al. |
| 2003/0004998 A1 | 1/2003 | Datta |
| 2003/0105829 A1 | 6/2003 | Hayward |
| 2004/0032278 A1 | 2/2004 | Orii et al. |
| 2004/0105544 A1 | 6/2004 | Haneda et al. |
| 2004/0117309 A1 | 6/2004 | Inoue et al. |
| 2004/0167982 A1* | 8/2004 | Cohen ............... G06F 17/30876 709/226 |
| 2004/0170379 A1 | 9/2004 | Yao et al. |
| 2006/0021001 A1* | 1/2006 | Giles ................... H04L 63/0218 726/1 |
| 2006/0188097 A1 | 8/2006 | Taniguchi et al. |
| 2006/0288424 A1 | 12/2006 | Saito |
| 2007/0043667 A1 | 2/2007 | Qawami et al. |
| 2007/0250468 A1 | 10/2007 | Pieper |
| 2010/0070700 A1 | 3/2010 | Borst et al. |
| 2011/0191447 A1 | 8/2011 | Dazzi et al. |
| 2011/0307533 A1 | 12/2011 | Saeki |
| 2012/0041970 A1 | 2/2012 | Ghosh et al. |
| 2013/0254879 A1 | 9/2013 | Chesla et al. |
| 2013/0275549 A1 | 10/2013 | Field et al. |
| 2014/0244937 A1 | 8/2014 | Bloomstein et al. |
| 2014/0280606 A1 | 9/2014 | Long |
| 2014/0351871 A1 | 11/2014 | Bomfim et al. |
| 2015/0106864 A1 | 4/2015 | Li et al. |
| 2015/0200991 A1 | 7/2015 | Kwon |
| 2016/0142251 A1 | 5/2016 | Contreras et al. |
| 2016/0253262 A1 | 9/2016 | Nadgowda |
| 2016/0274929 A1 | 9/2016 | King |
| 2016/0366202 A1 | 12/2016 | Phillips et al. |
| 2017/0109316 A1 | 4/2017 | Hack et al. |
| 2017/0171146 A1 | 6/2017 | Sharma et al. |
| 2017/0214761 A1 | 7/2017 | Hsu et al. |
| 2018/0159757 A1 | 6/2018 | Uppal et al. |
| 2018/0159769 A1 | 6/2018 | Richardson et al. |
| 2018/0167444 A1 | 6/2018 | Sivasubramanian et al. |
| 2018/0167469 A1 | 6/2018 | Sivasubramanian et al. |
| 2018/0183689 A1 | 6/2018 | Ellsworth et al. |
| 2018/0191817 A1 | 7/2018 | Richardson et al. |
| 2018/0212880 A1 | 7/2018 | Mostert |

FOREIGN PATENT DOCUMENTS

| | | |
|---|---|---|
| CN | 1511399 A | 7/2004 |
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 A2 | 12/2008 |
| EP | 3156911 A1 | 4/2017 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |
| JP | 2003-167810 A | 6/2003 |
| JP | 2003-167813 A | 6/2003 |
| JP | 2003-188901 A | 7/2003 |
| JP | 2003-522358 A | 7/2003 |
| JP | 2004-070935 | 3/2004 |
| JP | 2004-532471 | 10/2004 |
| JP | 2004-533738 A | 11/2004 |
| JP | 2005-537687 | 12/2005 |
| JP | 2007-133896 A | 5/2007 |
| JP | 2007-207225 A | 8/2007 |
| JP | 2008-515106 A | 5/2008 |
| JP | 2009-071538 A | 4/2009 |
| JP | 2012-509623 | 4/2012 |
| JP | 2012-209623 | 10/2012 |
| WO | WO 2002/069608 A2 | 9/2002 |
| WO | WO 2005/071560 A1 | 8/2005 |
| WO | WO 2007/007960 A1 | 1/2007 |
| WO | WO 2007/126837 A2 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |
| WO | WO 2014/047073 A1 | 3/2014 |
| WO | WO 2017/106455 A1 | 6/2017 |

OTHER PUBLICATIONS

Examination Report in Indian Application No. 6213/CHENP/2010 dated May 23, 2018.
International Preliminary Report on Patentability in PCT/US/2016/066848 dated Jun. 19, 2018.
"Non-Final Office Action dated Jan. 3, 2012," U.S. Appl. No. 12/652,541; Jan. 3, 2012; 35 pages.
"Final Office Action dated Sep. 5, 2012," U.S. Appl. No. 12/652,541; Sep. 5, 2012; 40 pages.
"Notice of Allowance dated Jan. 4, 2013," U.S. Appl. No. 12/652,541; Jan. 4, 2013; 11 pages.

(56) References Cited

OTHER PUBLICATIONS

"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdeliverynetwork&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONG-MAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL:http://web.archive.org/web/20020210124615/www.abanet.org/scitech/ec/isc/dsg-tutorial.html; pp. 1-8.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL:http://tools.ietf.org/rfc/rfc3568.txt).
Bellovin, S., "Distributed Firewalls," ;login;:37-39, Nov. 1999, http://www.cs.columbia.edu/-smb/papers/distfw. html, 10 pages, retrieved Nov. 11, 2005.

Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24,2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. Of Networking 2005, all pages.
Gunther et al, "Measuring Round Trip Times to determine the Distance between WLAN Nodes", Dec. 18, 2004, Technical University Berlin, all pages.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Hartung et al.; Digital rights management and watermarking of multimedia content for m-commerce applications; Published in: Communications Magazine, IEEE (vol.38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, 26-30 Mar. 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protoco—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables _ Basics.html, 4 pages.
Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE

(56) References Cited

OTHER PUBLICATIONS

SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Sharif et al, "Secure In-VM Monitoring Using Hardware Virtualization", Microsoft, Oct. 2009 http://research.microsoft.com/pubs/153179/sim-ccs09.pdf; 11 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on The Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, And Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, pp. 202-211.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No.2011-502139 dated Nov. 5, 2013.
Decision of Rejection in Application No. 2011-502139 dated Jun. 30, 2014.
Office Action in Japanese Application No. 2011-502139 dated Aug. 17, 2015.
Office Action in Indian Application No. 5937/CHENP/2010 dated Jan. 19, 2018.
Singapore Written Opinion in Application No. 201006874-0, dated Oct. 12, 2011 in 10 pages.
First Office Action in Japanese Application No. 201 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report in European Application No. 09839809.2 dated May 11, 2015.
Office Action in European Application No. 09839809.2 dated Dec. 8, 2016.
Office Action in Indian Application No. 6210/CHENP/2010 dated Mar. 27, 2018.
Supplementary European Search Report in Application No. 09728756.9 dated Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Office Action in Japanese Application No. 2014-225580 dated Oct. 26, 2015.
Office Action in Japanese Application No. 2014-225580 dated Oct. 3, 2016.
Search Report and Written Opinion issued in Singapore Application No. 201006873-2 dated Oct. 12, 2011.

(56) References Cited

OTHER PUBLICATIONS

First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Japanese Application No. 2011-516466 dated May 30, 2016.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Partial Supplementary Search Report in European Application No. 09826977.2 dated Oct. 4, 2016.
Search Report and Written Opinion in Singapore Application No. 201103333-9 dated Nov. 19, 2012.
Examination Report in Singapore Application No. 201103333-9 dated Aug. 13, 2013.
Office Action in Chinese Application No. 201310717573.1 dated Jul. 29, 2016.
Office Action in European Application No. 11767118.0 dated Feb. 3, 2017.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Third Office Action in Chinese Application No. 201180046104.0 dated Apr. 14, 2016.
Decision of Rejection in Chinese Application No. 201180046104.0 dated Oct. 17, 2016.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
Office Action in Canadian Application No. 2816612 dated Oct. 7, 2016.
Office Action in Canadian Application No. 2816612 dated Aug. 8, 2017.
First Office Action in Chinese Application No. 201180053405.6 dated Feb. 10, 2015.
Second Office Action in Chinese Application No. 201180053405.6 dated Dec. 4, 2015.
Office Action in Japanese Application No. 2013-540982 dated Jun. 2, 2014.
Written Opinion in Singapore Application No. 201303521-7 dated May 20, 2014.
Office Action in Japanese Application No. 2015-533132 dated Apr. 25, 2016.
Office Action in Canadian Application No. 2884796 dated Apr. 28, 2016.
Office Action in Russian Application No. 2015114568 dated May 16, 2016.
Supplementary Examination Report in Singapore Application No. 11201501987U dated May 17, 2017.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Chinese Application No. 201310537815.9 dated Feb. 1, 2018.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 4 pages.
Office Action in Japanese Application No. 2015-075644 dated Apr. 5, 2016.
Office Action in European Application No. 07754164.7 dated Dec. 14, 2015.
Office Action in European Application No. 07754164.7 dated Jan. 25, 2018.
Office Action in Chinese Application No. 201310537815.9 dated Jul. 5, 2016.
Office Action in Chinese Application No. 201310537815.9 dated Jun. 2, 2017.
International Search Report and Written Opinion in PCT/US/2016/066848 dated May 1, 2017.
International Search Report and Written Opinion in PCT/US2017/055156 dated Dec. 13, 2017.

* cited by examiner

REQUEST ROUTING PROCESSING

CROSS REFERENCE TO RELATED APPLICATIONS

This application is a continuation of U.S. patent application Ser. No. 14/629,433, entitled "REQUEST ROUTING PROCESSING" and filed Feb. 23, 2015, which in turn is a continuation of U.S. patent application Ser. No. 13/873,040, now U.S. Pat. No. 9,003,040, entitled "REQUEST ROUTING PROCESSING" and filed Apr. 29, 2013, which is a continuation of U.S. patent application Ser. No. 12/952,118, now U.S. Pat. No. 8,452,874, entitled "REQUEST ROUTING PROCESSING" and filed Nov. 22, 2010, the disclosures of which are incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

In some embodiments, the content providers can utilize one or more service providers, such as content delivery network service providers and network storage service providers, to provide services related to the delivery of requested content. In a similar manner, service providers are generally motivated to provide services, such as hosting DNS request processing services or providing content to client computing devices, often with consideration of the efficiency and cost associated with the requested services. For example, service providers often consider factors such as latency of delivery of requested content in processing client computing device requests (either DNS queries or content requests) in order to meet service level agreements or to generally improve the quality of delivered service. In some situations, the service providers may encounter that a number of service requests processed on behalf of a content provider can exceed a threshold, such as in accordance with a malicious attack or beyond an agreed up level of service. In situations related to malicious attacks, such as a DNS-based attack, the level of service provided by the service provider to the targeted content provider can be impacted and in some situations, the overall function of the service provider can be affected.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
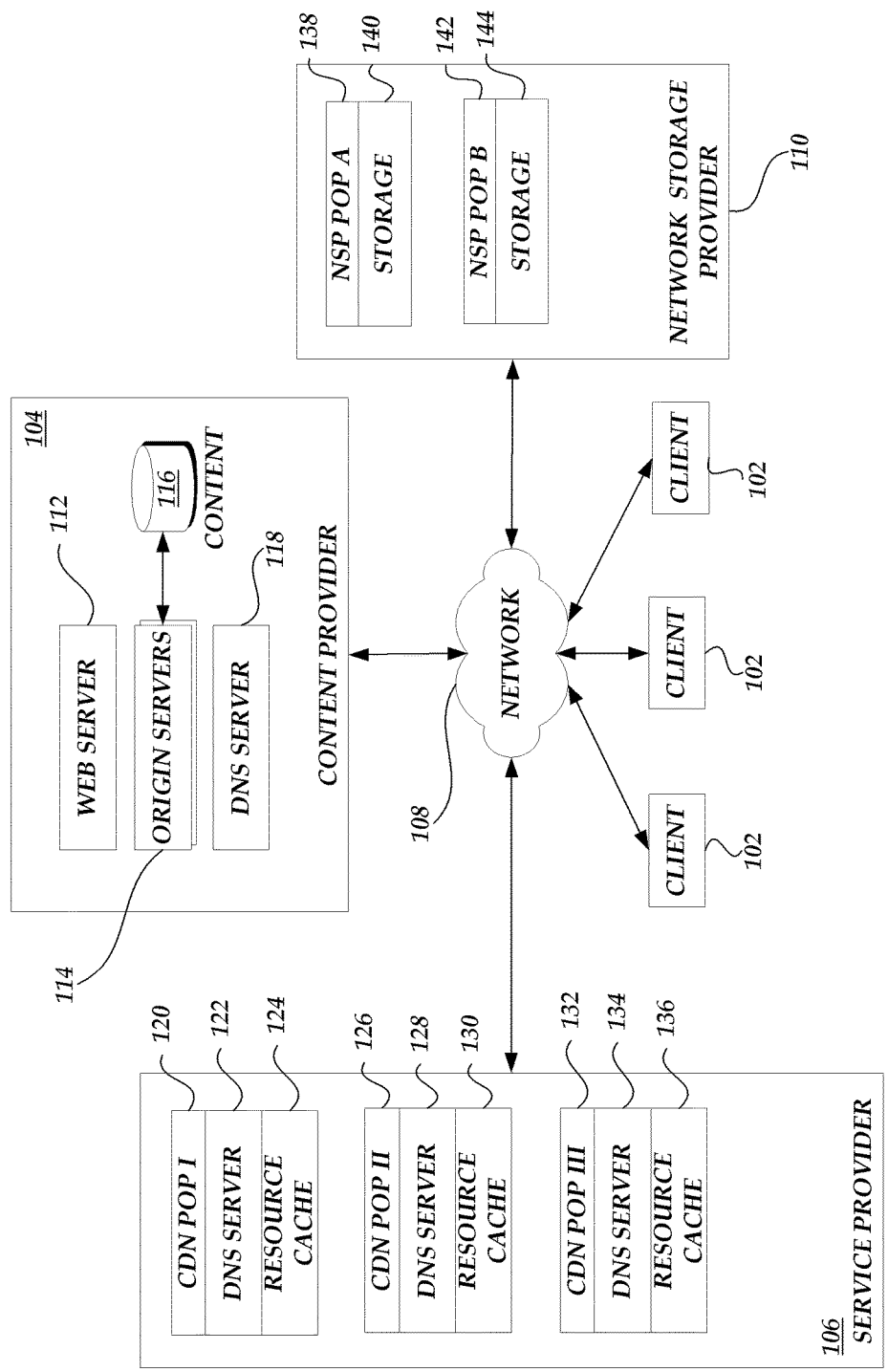
FIG. 1 is a block diagram illustrative of content delivery environment including a number of client computing devices, a content provider, a network storage provider, and a content delivery network service provider.

Generally described, the present disclosure is directed to managing requesting routing functionality corresponding to resource requests for one or more resources associated with a content provider. Aspects of the disclosure will be described with regard to the management and processing request routing functionality by a service provider, such as a content delivery network ("CDN") service provider, on behalf of an entity requesting the request routing functionality, such as a content provider. Illustratively, the request routing functionality can correspond to the processing, by computing devices associated with the service provider, such as a DNS server component associated with a specific network address, of domain name service ("DNS") requests on behalf of a content provider. The service provider DNS server components resolve the received DNS queries by identifying a network address of a computing device that will provide requested resources, such as a cache component. Additionally, in embodiments in which the number of DNS queries issued to a targeted content provider domain exceeds a threshold, the service provider can selectively filter DNS queries to mitigate the effect of the incoming DNS queries. For example, in situations associated with a DNS query-based attack, some portion of the DNS queries can be filtered to mitigate the effect of the DNS query-based attack.

In one embodiment, the service provider can assign a number of DNS server components that will be authoritative for DNS queries to an identified content provider domain on behalf of a content provider. The assigned DNS server components correspond to network addresses that are selected by the service provider from a distributed set of service provider network addresses in a manner that takes into consideration a number of aspects. In one aspect, the service provider can implement processes for ensuring that no two domains, regardless of the owner, are serviced by service provider DNS server components in which the set DNS server components have matching network addresses.

In another aspect, the service provider can implement processes for ensuring that, for a specific domain, the portion of the network addresses of the assigned DNS server components significant for network routing purposes do not having matching values and that the portion of the network addresses of the assigned DNS server component not significant for network routing purposes also do not have matching values.

In embodiments in which the number of received DNS queries exceeds a threshold, such as in DNS query-based attacks, the service provider can implement a number of techniques that results in the filtering of the DNS queries in a manner that can mitigate performance impact associated with the services provided to the content provider domain or the overall performance of the service provider components. For example, the service provider can facilitate the selective filtering of DNS queries from one or more of the ranges of network addresses. In another example, the service provider can facilitate the selective filtering of DNS queries by configuring DNS queries directed toward a specific DNS server network address to be processed by specific DNS server components, such as by forwarding DNS queries.

Although various aspects of the disclosure will be described with regard to illustrative examples and embodiments, one skilled in the art will appreciate that the disclosed embodiments and examples should not be construed as limiting. For example, the present disclosure may be described with regard to request routing services provided by a service provider, such as a CDN service provider, that may provide additional services and functionality including network-based storage services, caching services, and content delivery services. However, one skilled in the relevant art will appreciate that a service provider need not provide all, or any, of the additional services or functionality that may be associated with some service providers, such as a CDN service provider. Likewise, although the present application will be discussed with regard to a content provider as the requestor of services, such as the DNS request processing services, the one skilled in the relevant art will appreciate that the requestor of the service need not provide any additional functionality that may be otherwise attributed to content providers.

FIG. 1 is a block diagram illustrative of content delivery environment 100 for the managing registration of content provider with a service provider, such as a CDN service provider, and subsequent processing of at least a portion of content requests on behalf of the content provider. As illustrated in FIG. 1, the content delivery environment 100 includes a number of client computing devices 102 (generally referred to as clients) for requesting content from a content provider, a network storage provider 110, and/or a service provider 106. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS name server, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources and the like. Additionally, although the origin server component 114 and associated storage component 116 are logically associated with the content provider 104, the origin server component 114 and associated storage components 116 may be geographically distributed throughout the communication network 108 in a manner to best serve various demographics of client computing devices 102. Still further, although illustrative components have been described with regard to the content provider 104, a content provider may have any configuration of components associated with a domain addressable on the communication network 108.

As further illustrated in FIG. 1, the content provider 104 can be associated with one or more DNS name server components 118 that are operative to receive DNS queries related to registered domain names associated with the content provider. The one or more DNS name servers can be authoritative to resolve client computing device DNS queries corresponding to the registered domain names of the content provider 104. A DNS name server component is considered to be authoritative to a DNS query if the DNS name server can resolve the query by providing a responsive IP address. As will be explained in greater detail below, in accordance with illustrative embodiments, at least a portion of the request routing functionality provider the DNS name server components 118 will be provided by a service provider on behalf of the content provider 104.

With continued reference to FIG. 1, the content delivery environment 100 can further include a service provider 106 in communication with the one or more client computing devices 102, the content provider 104, and the network storage provider 110 via the communication network 108. The service provider 106 illustrated in FIG. 1 corresponds to a logical association of one or more computing devices associated with a service provider. Specifically, the service provider 106 can include a number of Point of Presence ("POP") locations 120, 126, 132 that correspond to nodes on the communication network 108. Each POP 120, 126, 132 includes a DNS component 122, 128, 134 made up of a number of DNS server computing devices for resolving DNS queries from the client computers 102. Each POP 120, 126, 132 also optionally includes a resource cache component 124, 130, 136 made up of a number of cache server computing devices for storing resources from content providers or network storage providers and transmitting various requested resources to various client computers. The DNS components 122, 128, 134 and the resource cache components 124, 130, 136 may further include additional software and/or hardware components that facilitate communications including, but not limited, load balancing or load sharing software/hardware components.

In an illustrative embodiment, the DNS component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the service provider 106 can be associated with various additional computing resources, such additional computing devices for administration of content and resources, and the like.

With further continued reference to FIG. 1, the content delivery environment 100 can also include a network storage provider 110 in communication with the one or more client computing devices 102, the service provider 106, and the content provider 104 via the communication network 108. The network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 142 that correspond to nodes on the communication network 108. Each NSP POP 138, 142includes a storage component 140, 144 made up of a number of storage devices for storing resources from content providers which will be processed by the network storage provider 110 and transmitted to various client computers. The storage components 140, 144 may further include additional software and/or hardware components that facilitate communications including, but not limited to, load balancing or load sharing software/hardware components.

In an illustrative embodiment, the storage components 140, 144 are considered to be logically grouped, regardless of whether the components, or portions of the components, are physically separate. Additionally, although the NSP POPs 138, 142 are illustrated in FIG. 1 as logically associated with the network storage provider 110, the NSP POPs will be geographically distributed throughout the communication network 108 in a manner to best serve various demographics of client computing devices 102. Additionally, one skilled in the relevant art will appreciate that the network storage provider 110 can be associated with various additional computing resources, such additional computing devices for administration of content and resources, DNS name servers, and the like.

Even further, one skilled in the relevant art will appreciate that the components of the network storage provider 110 and components of the service provider 106 can be managed by the same or different entities. One skilled in the relevant art will also appreciate that the components and configurations provided in FIG. 1 are illustrative in nature. Accordingly, additional or alternative components and/or configurations, especially regarding the additional components, systems, and subsystems for facilitating communications may be utilized. Specifically, one skilled in the relevant art will appreciate the network storage provider 110 may be omitted from the content delivery environment 100.

With reference now to FIGS. 2-5B, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
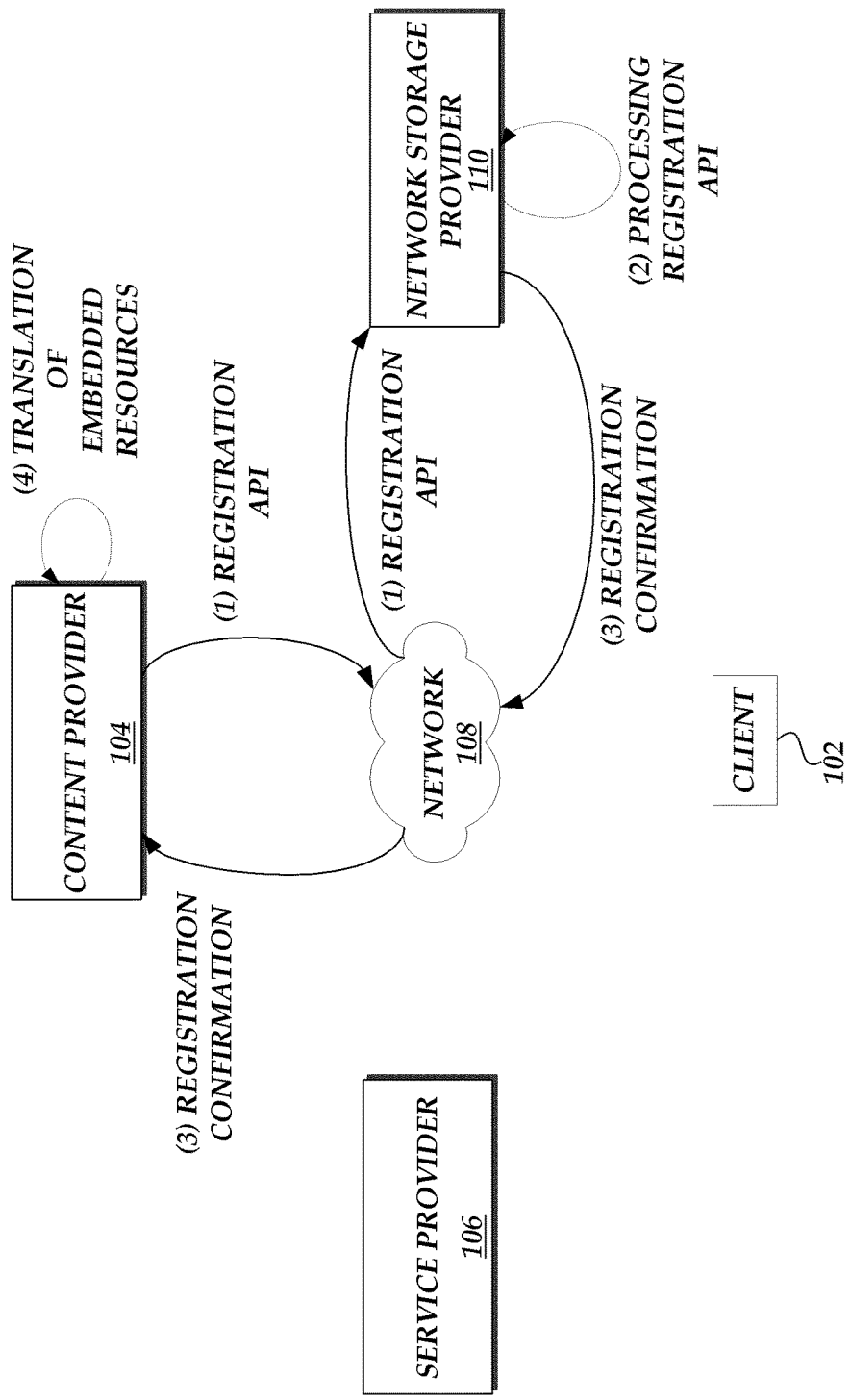
FIG. 2 is a block diagram of the content delivery environment of FIG. 1 illustrating the registration of a content provider with a network storage provider.

With reference to FIG. 2, an illustrative interaction for the optional registration of a content provider 104 with the network storage provider 110 for hosting content on behalf of the content provider 104 will be described. As illustrated in FIG. 2, the storage provider content registration process begins with registration of the content provider 104 with the network storage provider 110. In an illustrative embodiment, the content provider 104 utilizes a registration application program interface ("API") to register with the network storage provider 110 such that the network storage provider 110 can provide content on behalf of the content provider 104. The registration API can include the identification of the origin server 114 of the content provider 104 that may provide requested resources to the network storage provider 110. In addition or alternatively, the registration API can include the content to be stored by the network storage provider 110 on behalf of the content provider 104. In one embodiment, the network storage provider 110 may act as an origin server for the content provider 104.

With continued reference to FIG. 2, upon receiving the registration API, the network storage provider 110 obtains and processes the content provider registration information. In an illustrative embodiment, the network storage provider 110 can then generate additional information that will be used by the client computing devices 102 as part of the content requests. The additional information can include, without limitation, content provider identifiers, such as content provider identification codes, storage provider identifiers, such as storage provider identification codes, executable code for processing resource identifiers, such as script-based instructions, and the like. One skilled in the relevant art will appreciate that various types of additional information may be generated by the network storage provider 110 and that the additional information may be embodied in any one of a variety of formats.

In one embodiment, the network storage provider 110 returns an identification of applicable domains for the network storage provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 114 to a domain corresponding to the network storage provider 110. The translated URLs are embedded into requested content in a manner such that DNS queries for the translated URLs will resolve to a DNS server corresponding to the network storage provider 110 and not a DNS server corresponding to the content provider 104.

Figure 3:
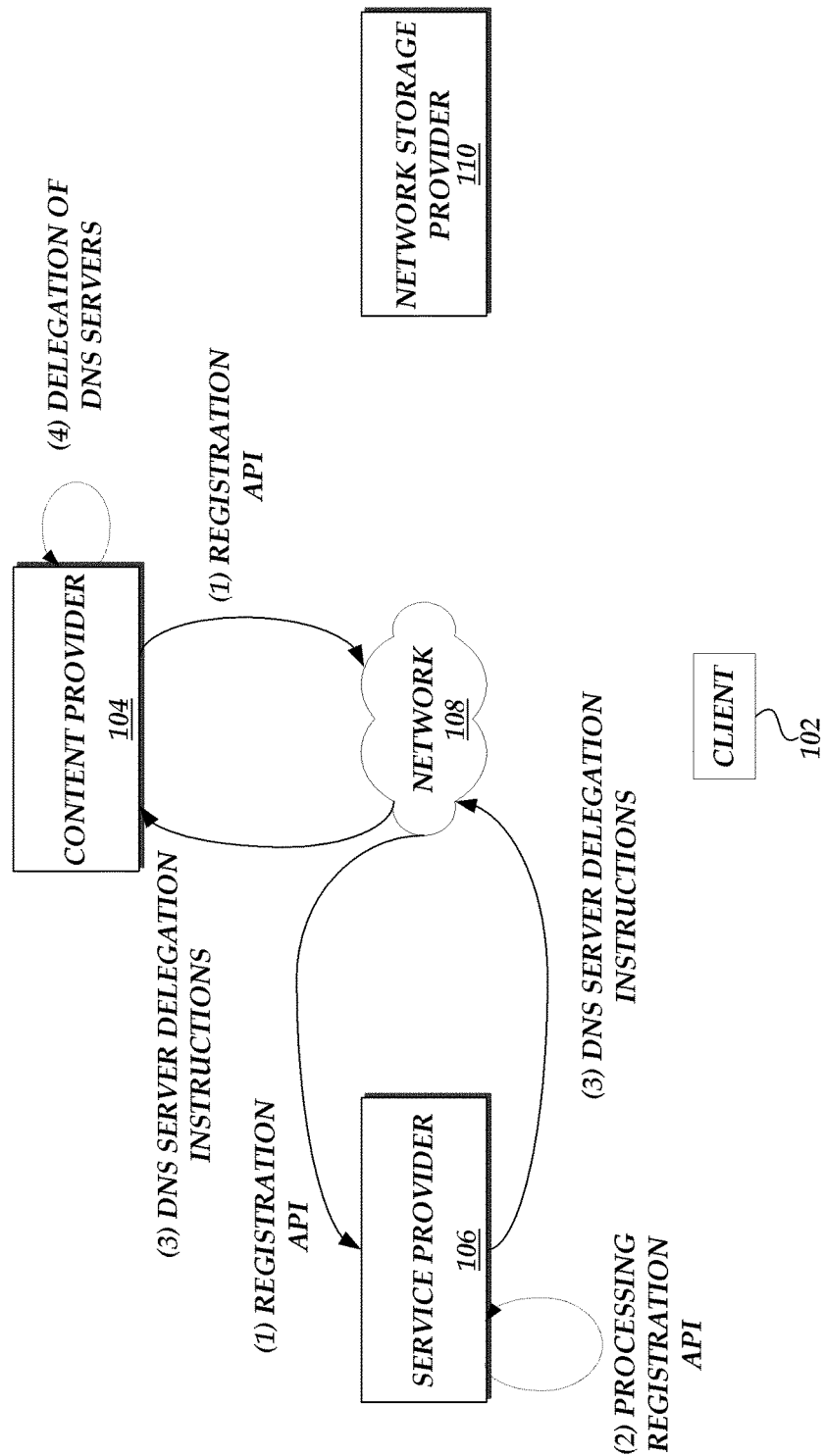
FIG. 3 is a block diagram of the content delivery environment of FIG. 1 illustrating the registration of a content provider with a service provider for providing request routing services on behalf of the content provider.

With reference now to FIG. 3, an illustrative interaction for registration, by the content provider 104, to utilize the request routing services provided by the service provider 106 will be described. As illustrated in FIG. 3, the request routing service registration process provided by the service provider 106 begins with registration of the content provider 104 with the service provider 106. In an illustrative embodiment, the content provider 104 utilizes a registration API to register with the service provider 106 such that the service provider 106 can provide request routing services on behalf of the content provider 104. The registration API includes the identification of the domains for which the service provider 106 will be authoritative (e.g., "contentprovider.com"), the identification of the storage component 140, 144 of the network storage provider 110 or origin servers 114 that will provide requested resources to the client computing devices 102. The registration API can also include additional information including request routing information, identification information, or other information that will be used to resolve client computing device DNS requests on behalf of the content provider 104, as will be explained below.

The service provider 106 obtains the registration API and processes the information. In one aspect, the service provider 106 can generate the necessary request processing rules or alternative identifiers that may be utilized in the resolution of client computing device DNS queries. In another aspect, the service provider 106 can cause the registration of its DNS nameserver components for the relevant domains specified by the content provider 104. The service provider 104 can then send a response to the content provider 104, such as a confirmation. Responsive to the processing of the registration API, the service provider 106 can identify the network addresses of the service provider DNS servers, such as an Internet Protocol address, that will process DNS queries on behalf of the content provider 104. The content provider 104 can then delegate the identified network addresses of the DNS servers that will be responsible for the identified content provider domain (e.g., "contentprovider.com").

As will be explained in greater detail below, in one embodiment, the service provider 106 can distribute, or otherwise assign, network addresses associated with the DNS server components that will be authoritative to DNS requests to the content provider domain. Specifically, in embodiments in which the service provider 106 will assign a number of DNS server components that will be authoritative for a content provider domain, the service provider can first create a number of subdivisions, or zones, of network addresses available to the service provider. The number of subdivisions or zones corresponds to a distribution of the network addresses such that a selection of a network address from each of the subdivisions or zones ensures that a particular domain's DNS server components have distributed network addresses and avoids situations in which any two assigned DNS server components would have completely overlapping, or exactly matching, network addresses (unless the number of subdivisions or zones is less than the number of DNS server components being assigned as authoritative for a domain). The distribution from different subdivisions can be generally referred to as a "non-overlapping distribution."

For purposes of an illustrative example, assume that the service provider 106 has a pool of available network addresses. The service provider 106 can organize the pool into two or more ranges of network addresses. For example, the ranges can be defined in a manner such that each network address having a common highest ordered octet could be considered to be in the same range. In another example, the ranges can be defined in a manner such two or more ranges may share a common highest ordered octet, but are distinguished by different second octets. Further, in another embodiment, the ranges of network addresses can correspond to a number of network addresses available for assignment. In alternative embodiments, at least one range of network address can correspond to a single network address for assignment.

As discussed above, each range of network addresses can be considered to a subdivision or zone of the available network addresses. In one aspect, if the number of subdivisions is equal or greater than the number of network addresses that need to be assigned, the service provider 106 ensures a distribution of network addresses for the DNS server components such that no two network addresses will be matching by selecting a network address from different subdivisions. With reference to the previous example in which ranges are determined according to the highest ordered octet of the network address, each selected network address would correspond to a different value of the highest order octet, which ensures that at least that portion of the network addresses do not overlap (e.g., the second, third, fourth octets) and that no two network addresses for the particular domain will be matching. With reference to another example in which two ranges share common first and second octets, each selected network address would correspond to a different value of the third order octet, which still ensures that at least that portion of the network addresses do not overlap and that no two network addresses for the particular domain will be matching. Depending on the pool of network addresses available to the service provider 106, the ranges of network addresses associated with each subdivision or zone can be configured in various manners depending on the desired distribution of network addresses, the total number of available network addresses and the differences in values among the available network addresses.

In some embodiments, in addition to ensuring a "non-overlapping" distribution of assigned network addresses for a specific domain, if the service provider 106 processes multiple requests for different domains, there is the possibility that such a non-overlapping distribution could result in two or more different domains having at least one assigned DNS network address that matches. In some embodiments, the service provider 106 may wish to establish a threshold number of network addresses that can be matched across unrelated domains (e.g., one, two, three, etc.) or, conversely, a minimum number of network addresses that are not exactly matching between any two non-related domains. Accordingly, the service provider 106 can include different levels of processing regarding any potentially matching assigned network address in accordance with the established threshold of number of acceptable matching network addresses.

In one embodiment, if the threshold is set to zero such that there can be no matching network addresses, the service provider 106 can ensure that the assigned network addresses of DNS servers do not overlap by removing a DNS server's network address from the pool of available network addresses has been assigned. One example of such a scenario is if there are two or more hosted domains that have a common name (e.g., www.domain.com) and therefore, cannot have any matching DNS server component network addresses. In another embodiment, it may be possible for two domains to share one or more assigned network address of a DNS server component. However, it may be desirable for the service provider 106 to ensure that no two specific domains are assigned the exact same network addresses from each of the subdivisions or that, for any two domains, no more than half of the assigned DNS server component network addresses are matching. In such embodiments, the service provider 106 can conduct additional processing to ensure and correct for matching network addresses, such as by reducing the number of matching network addresses below the threshold.

In addition to ensuring that assigned network addresses for a specific domain are distributed in a non-overlapping manner and further ensuring that the number of matching network addresses with regard to another domain are not above a threshold, in another embodiment, the service provider 106 can select portions of the selected network addresses from each subdivision such that there is further no overlap in the portions of the selected network addresses that are not typically considered significant for purposes of routing. Specifically, in one embodiment, the network addresses can corresponds to a number of bits that are divided into octets having unique values. For example, a 16-bit network address can be represented in the form of xx.xx.xx.xx in which each xx pair is an octet. Likewise, a 24-bit network address can be represented in the form of yy.yy.yy.yy.yy.yy in which each yy pair represented by four bits. In accordance with network routing principles, a portion of the network address is utilized for network routing (e.g., the first 2 or 3 octets) and is generally referred to as the "most significant portion of the network address" or the "network portion of the network address." The remaining portion of the network address (e.g., the last octet) is not considered to be significant for purposes of network routing and is generally referred to as the "non-significant portion of the network address" or the "host portion of the network address." One skilled in the relevant art will appreciate that the number of octets in a network address that are considered "significant" or "non-significant" may vary according to the specific network protocol being utilized, the configuration of network routing equipment, and other criteria. Accordingly, the example number of octets utilized to illustrate the difference between the significant and non-significant portions of a network address are illustrative in nature and should not be construed as limiting.

For purposes of network routing, network addresses are considered to be non-overlapping or non-matching so long as the significant portions of the network addresses do not exactly match, regardless of whether there are one or more matching octets. The non-significant portions of the network address are effectively ignored for purposes of network routing. Accordingly, in this embodiment, the service provider 106 can select different values for the non-significant portions of the selected network addresses for a specific domain such that there is also no overlap the non-significant portions of the selected network address for a specific domain do not exactly match, even if there is some partial matching.

With reference to the previous example, if we assume that four network addresses are selected and the non-significant portion of the network addresses correspond to the last octet in the network address, the non-significant portion of the network addresses can be subdivided into four ranges of values such there is no overlap in the assigned values for the least most significant bits. Continuing with this example, the last octet has a range of 256 total potential values. Since each domain is illustratively associated with four network addresses, the potential values of the last octet can be divided into ranges of values of 1-63, 64-127, 128-191, and 192-255. Accordingly, the value of the last octet for the first assigned network address would be picked from the range of 1-63; the value of the last octet for the second assigned network address would be picked from the range of 64-127; the value of the last octet for the third assigned network address would be picked from the range of 128-191; and the value of the last octet for the fourth assigned network address would be picked from the range of 192-255. Thus, in this embodiment, the resulting assigned network addresses would be completely non-overlapping with regard to not only the significant portions of the network addresses but also with regard to the non-overlapping portions of the network addresses.

In the event that a number of DNS queries exceed a threshold, such due to a DNS query based attack or due to a spike in requests, the service provider 106 can selectively filter DNS queries from one or more selected network address. If the "excessive" DNS queries are targeted toward a specific content provider, the service provider 106 may be able to maintain some DNS query functionality by filtering out less than all the assigned subdivisions for the targeted domain. Additionally, the service provider 106 can also mitigate the impact of such excessive DNS queries to the request routing services provided to other non-targeted content providers by filtering out some or all of the assigned subdivisions for the targeted domain or by limiting the processing of DNS queries to a targeted domain to specific physical computing devices. Still further, the service provider 106 can forward some portion of the DNS queries to different points of presence or DNS server components to help mitigate the impact of the number of DNS queries.

Illustratively, upon the optional identification of appropriate storage component 140, 144, 148 of the network storage provider 110 and the registration for request routing functionality with the service provider 106, the content provider 104 can, in one embodiment as will be further described below in reference to FIGS. 4 and 5A and 5B, begin to process DNS requests for content generated on behalf of the client computing devices 102. Specifically, in accordance with DNS routing principles, a client computing device DNS query corresponding to a resource identifier would eventually be resolved by identifying a network address corresponding to either the origin server component 114 and associated storage component 116 or storage component 140, 144, 148 of the network storage provider 110 by a DNS nameserver associated with the service provider 106.

Figure 4:
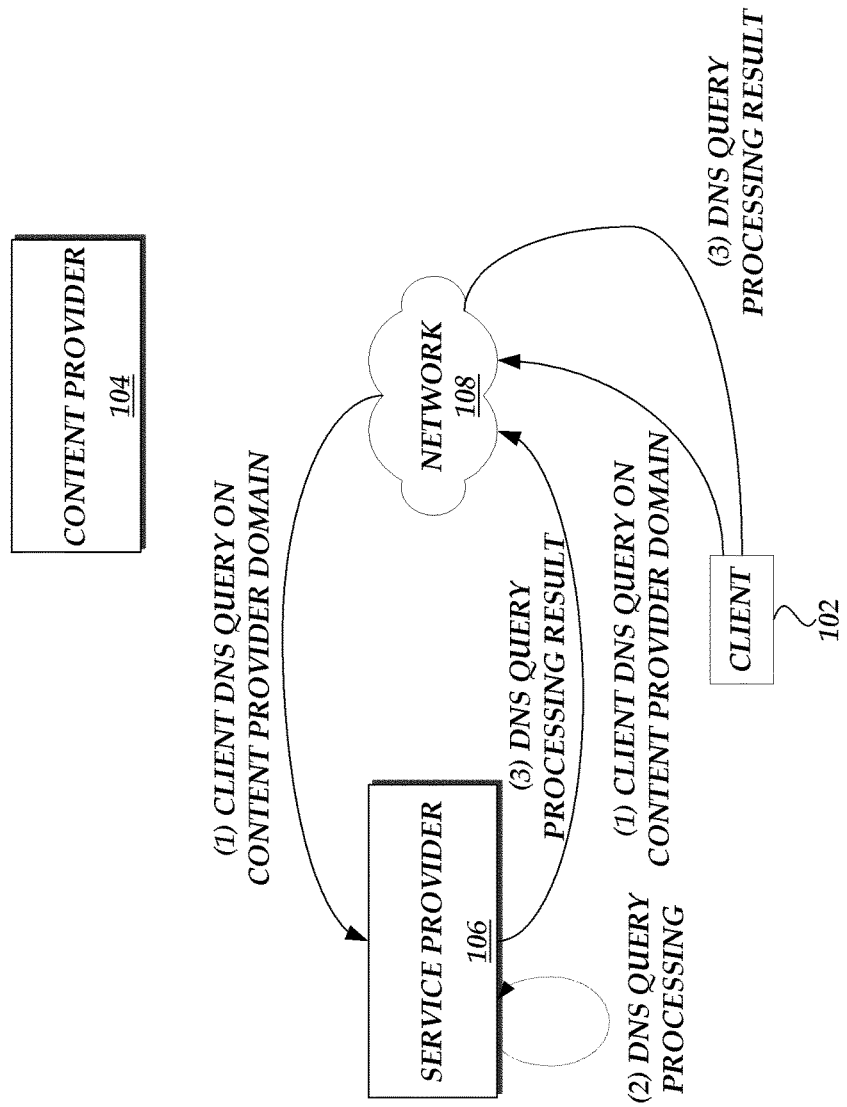
FIG. 4 is a block diagram of the content delivery environment of FIG. 1 illustrating the processing of request routing requests by a service provider on behalf of the content provider.

Turning now to FIG. 4, in accordance with one embodiment once the service provider 106 has begun processing request routing functionality on behalf of the content provider, a client computing device 102 issues a DNS query for the content provider domain (e.g., "contentprovider.com"). Illustratively, the client computing device 102, such as through a browser software application, issues a DNS query for the content provider domain that first results in the identification of a DNS server authoritative to the "." and the "com" portions of the domain. After partially resolving the domain according to the "." and "com" portions of the domain, the client computing device 102 then issues another DNS query for the URL that results in ".contentprovider" portion of the domain. The issuance of DNS queries corresponding to the "." and the "com" portions of a domain are well known and have not been illustrated.

In an illustrative embodiment, the identification of the identification of a DNS server authoritative to the "contentprovider" corresponds to one of the assigned IP addresses of a DNS server associated with the service provider 106. In one embodiment, the IP address is a specific network address unique to DNS server component(s) of a specific POP associated with the service provider 106. In another embodiment, the IP address can be shared by one or more POPs associated with the service provider 106, which may be geographically or logically distributed. In this embodiment, a DNS query to the shared IP address utilizes a one-to-many network routing schema, such as anycast, such a specific POP will receive the request as a function of network topology. For example, in an anycast implementation, a DNS query issued by a client computing device 102 to a shared IP address will arrive at a DNS server component of the service provider 106 logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a service provider POP.

As illustrated in FIG. 4, a DNS server component of the service provider 106 obtains the DNS query and can resolve the DNS query by providing a network address, such as an IP address, of a component for providing the request content. For example, the receiving DNS server component may provide an IP address of a Web server that can provide a requested Web page. In another example, the DNS server may provider an IP address of a cache component that may provide a request resource or file. In an alternative embodiment, the DNS server component may also provide alternative identifiers, such as canonical names ("CNAMES") that can be used to refine request routing processing. In the example illustrated in FIG. 4, it is assumed that the DNS query transmitted by the client computing device 102 can be processed.

Figure 5A:
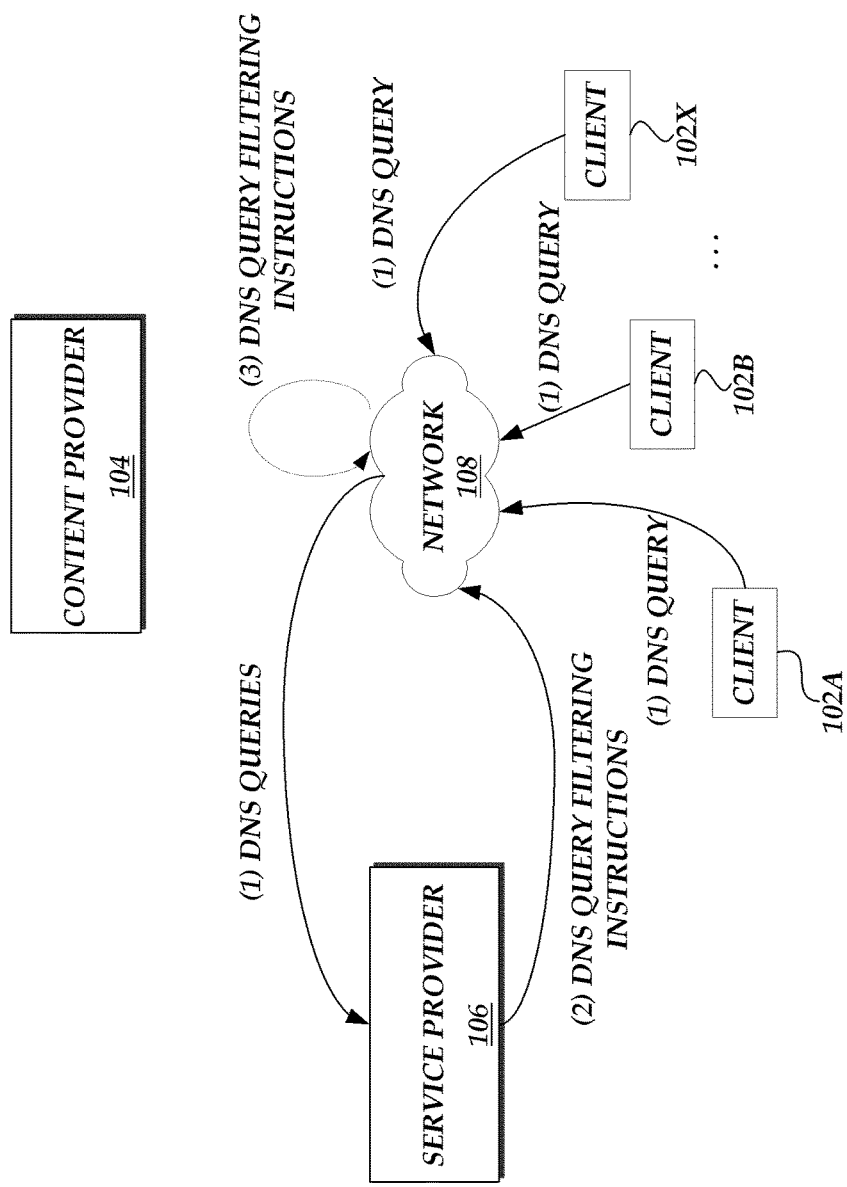
FIGS. 5A and 5B are block diagrams of the content delivery environment of FIG. 1 illustrating one embodiment of the processing of resource routing requests generated by client computing devices.
Figure 5B:
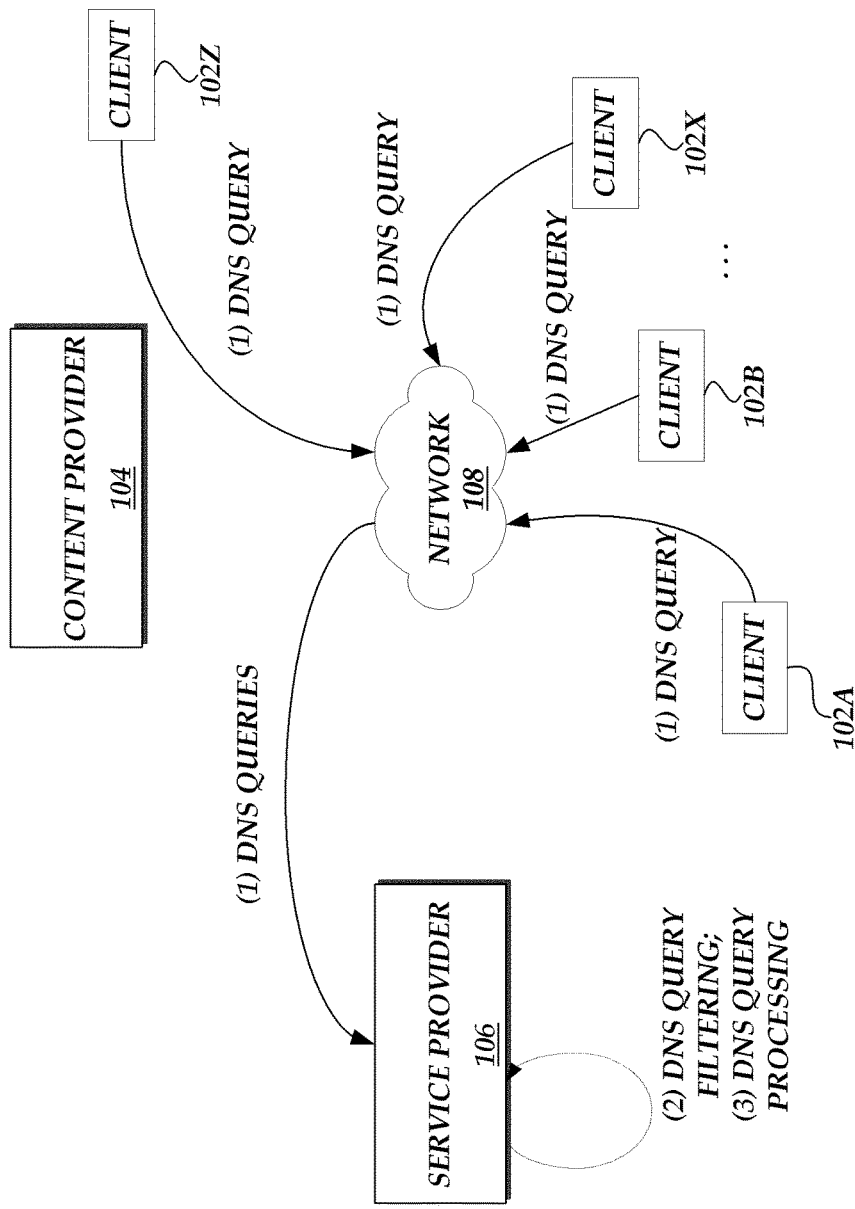

Turning now to FIGS. 5A and 5B, in other embodiments, the service provider 106 may obtain a number of DNS queries for a domain such that the number of DNS queries exceeds a threshold. As illustrated in FIG. 5A, exceeded threshold may be indicative of a DNS-based network attack in which multiple client computing devices 102 attempt to overload a content provider domain with DNS queries. The exceeded threshold may also be indicative of spikes in content requests or correspond to a number of DNS queries that exceeds agreed upon service levels. In one aspect, the multiple DNS queries may be directed to one of the specific assigned network addresses of the DNS server components processing DNS queries on behalf of the content provider 104. In another aspect, the multiple DNS queries may be directed to all the specific assigned network addresses for the content provider 104. Still further, in another aspect, the multiple DNS queries may not be targeted only to a specific content provider domain and may be indicative of a larger, network based attack.

In order to mitigate the impact of the DNS queries that have exceeded a threshold (or will exceed a threshold), the service provider 106 can begin causing the selective filtering at least portions of the DNS queries directed to one or more of the assigned network addresses. Specifically, in one embodiment, the service provider 106 can issue commands or utilize routing protocols that cause DNS queries to be filtered in the communication network 108 prior to being received by the service provider 106. For example, the service provider 106 can utilize a null route injection for identified network addresses that networking equipment, such as routers, to prevent the forwarding of the DNS queries.

With reference to FIGRUE 5B, in addition to the filtering of DNS queries in the communication network 108, the service provider 106 can utilize router access control lists to filter, or otherwise block, DNS queries directed to one or more of the assigned network address subdivisions or zones that are received at the service provider. If the DNS queries associated with the exceeded threshold are targeted to a particular subdivision or zone, the service provider 106 can further filter the excessive DNS queries to the targeted network address. If the DNS queries associated with the exceeded threshold are targeted to a larger number of subdivisions or zones, the service provider 106 can filter all the targeted domains to effectively stop queries.

Alternatively, the service provider can filter a percentage of zones in an effort to maintain a percentage DNS query processing functionality. For example, if a content provider 104 has been associated with a DNS server component for each of four zones, the service provider 106 can filter half of the assigned network addresses to maintain operation of the request routing functionality at least at a fifty percent level. As illustrated in FIG. 5B, by filtering only certain network address zones, at least some portion of DNS queries for the "targeted" content provider or other content providers, such as by client computing device 102Z can continued to be processed. Additionally, the service provider 106 can configure one or more specific DNS server components to process any remaining DNS queries that have not been filtered in the communication network 108 or by the service provider. Still further, the server provider 106 can forward at least a portion of the non-filtered DNS queries to other DNS server components that may be better suited to process the non-filtered DNS queries or to distribute the load at a specific POP.

Figure 6:
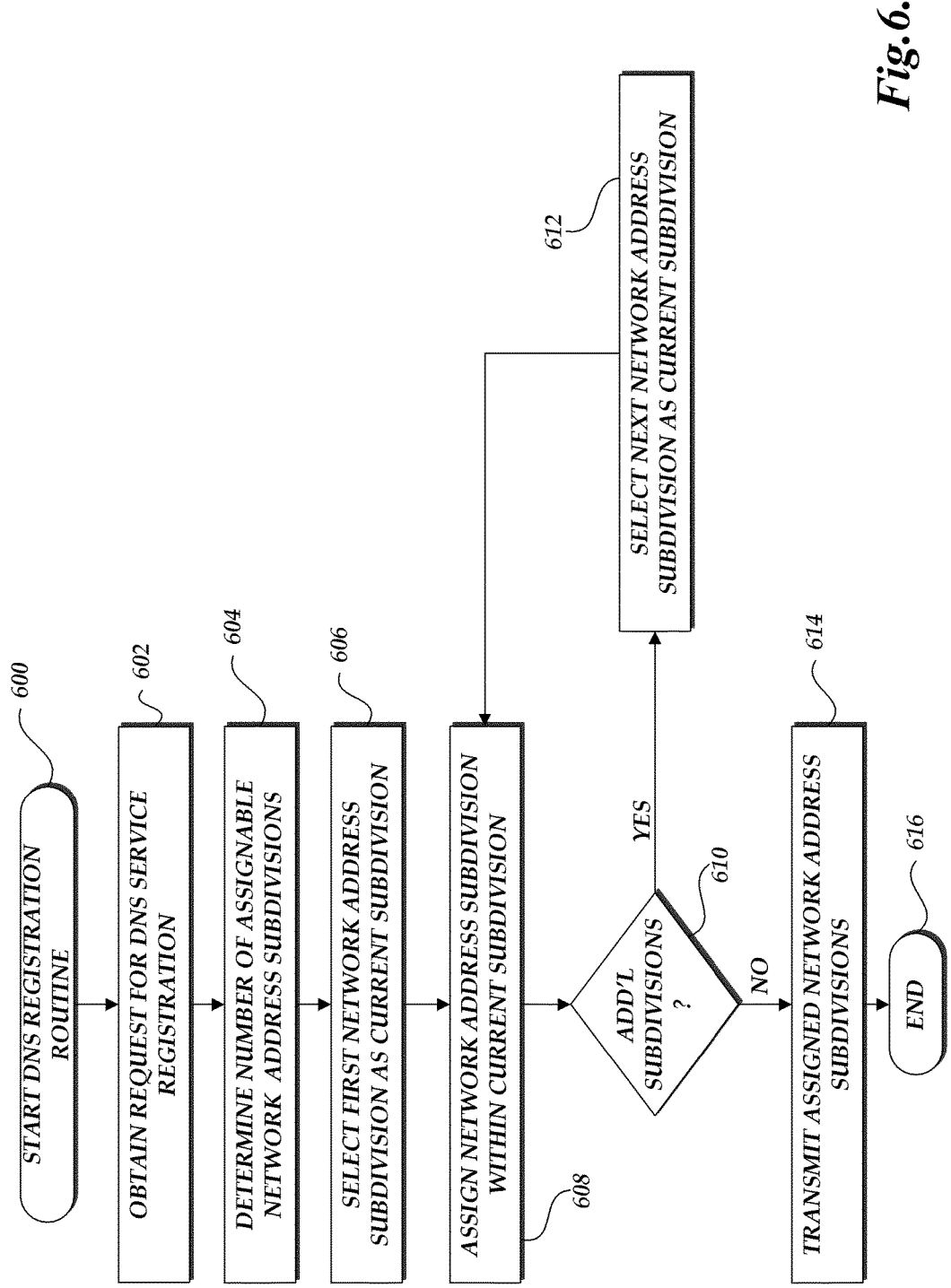
FIG. 6 is a flow diagram illustrative of a content provider request routing registration processing routine implemented by a service provider.

With reference now to FIG. 6, one embodiment of a routine 600 implemented by a service provider 106 for managing registration of content provider 104 will be described. One skilled in the relevant art will appreciate that actions/steps outlined for routine 600 may be implemented by one or many computing devices/components that are associated with the service provider 106, such as a DNS query processing component or a point of presence associated with the service provider. Accordingly, routine 600 has been logically associated as being generally performed by the service provider 106, and thus the following illustrative embodiments should not be construed as limiting.

At block 602, the service provider 106 obtains a request for providing DNS request routing services on behalf of a content provider 104. Illustratively, the request for providing DNS request routing services may be facilitated through a registration API in which the content provider specifies information necessary for the service provider 106 to begin hosting DNS nameserver functionality on behalf of the content provider. The transmission of the registration API (and associated information) may be an automatic process corresponding to an exchange of information between computing devices without need for administrator, or other human interaction. Alternatively, the transmission of the registration API (and associated information) may be an automatic process may be a manual, or semi-manual, process in which an administrator specifies at least a portion of the information necessary for the service provider 106 to begin hosting DNS nameserver functionality on behalf of the content provider.

At block 604, the service provider 106 determines a number of assignable network address subdivisions or zones. As previously described, in one embodiment, the service provider 106 may maintain two or more ranges of DNS server network addresses that can be assigned to content providers. Illustratively, the service provider can maintain a pool of available network addresses that correspond to the DNS server components that can be assigned to a content provider. Accordingly, the service provider 106 can organize the pool into two or more ranges of network addresses in which each range of network addresses corresponds to a subdivision or zone. As explained above, the service provider 106 can further select network addresses from the subdivisions to ensure that, for a specific domain, at least the significant portions of the set of assigned network addresses will not have any exactly matching values, regardless of whether is at least some common values. .

At block 606, the first network address subdivision is selected as a current network address subdivision and at block 608, the service provider 106 assigns a network address from the current network address subdivision. In an illustrative embodiment, in addition to the selection of a unique network address from the range of network addresses associated with the current network address subdivision, block 608 can also correspond to the service provider 106 selecting a value for the non-significant portion of the selected network addresses such that for a specific domain, at least the non-significant portions of the set of assigned network addresses also will not have any exactly matching values. One skilled in the relevant art will appreciate that the non-significant portions of the set of assigned network addresses will not be considered matching solely because some portion of the network addresses have common values. Still further, block 608 can also correspond to the service provider 106 can also conduct additional processing such that for two domains, regardless of ownership, the set of assigned network addresses (either significant portions or a combination of significant and non-significant portions) will have more than a threshold number of exactly matching network addresses. Additionally, the service provider 106 can also conduct some type of conflict resolution such that the assigned network address would not conflict with a previously assigned network address for any domain that would be considered a parent domain, a child domain, a sibling domain, etc. In such embodiment, the pool of available network addresses may be filtered to remove any potentially conflicting network addresses.

At decision block 610, a test is conducted to determine whether additional network subdivisions exist. If so, at block 612, the service provider 106 selects a next network address subdivision as the current network address subdivision and the routine 600 proceeds to block 608 to select another network address for the current subdivision. With reference to the previous example, the routine 600 can repeat to assign a network address for each of the remaining three network address subdivision ranges and values for the non-significant portions of the network address (e.g., ranges of 64-127, 128-191, and 192-254 for the last octet of the assigned network addresses). Additionally, the routine 600 can provide the additional conflict resolution or other limitation techniques, described above, to filter out network addresses that should not be assigned to the content provider. However, in alternative embodiment, the service provider 106 may not necessarily assign network addresses from all the available network address subdivisions or zones.

Once all the network addresses have been assigned, at block 614, the service provider 106 transmits assigned network addresses in response to the request for DNS service hosting. Based on the identified network addresses, the content provider can delegate the identified domain to the assigned network addresses. One skilled in the relevant art will appreciate that upon delegation of the assigned network addresses (or DNS nameserver names), the service provider 106 can host the DNS nameserver components on different computing devices in a manner that each physical computing device can correspond to one subdivision or zone or less than all the subdivisions or zones. At block 616, the routine 600 ends.

Figure 7:
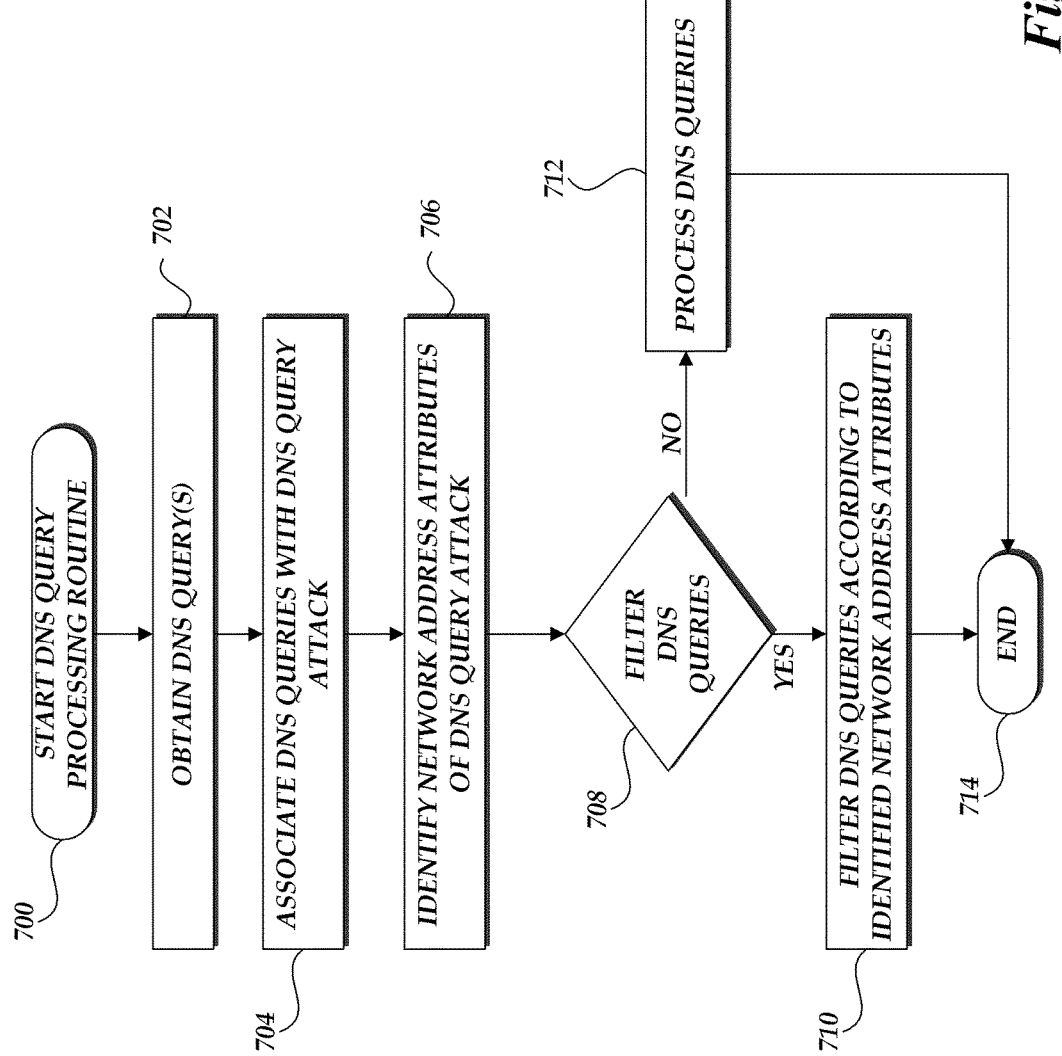
FIG. 7 is a flow diagram illustrative of a request routing processing routine implemented by a service provider.

With reference now to FIG. 7, one embodiment of a routine 700 implemented by the service provider 106 for processing DNS requests will be described. Similar to FIG. 6, one skilled in the relevant art will appreciate that actions/steps outlined for routine 700 may be implemented by one or many computing devices/components that are associated with the service provider 106. Accordingly, routine 700 has been logically associated as being generally performed by the service provider 106, and thus the following illustrative embodiments should not be construed as limiting.

At block 702, the service provider 106 obtains one or more DNS queries from client computing devices 102. Illustratively, the DNS queries are described as originating from separate client computing devices 102. However, at least some portion of the DNS queries may be transmitted by the same client computing device 102 or from some other component configured in a manner to generate multiple DNS queries. Additionally, in an alternative embodiment, the service provider 106 may receive an indication as to the number of DNS queries being transmitted without actual receipt of the DNS queries by the service provider.

At block 704, the service provider 106 associates the DNS queries with a set of DNS queries that have exceeded a threshold. As previously described, the exceeded threshold may be indicative of a DNS-based network attack in which multiple client computing devices 102 attempt to overload a content provider domain with DNS queries. The exceeded threshold may also be indicative of spikes in content requests or correspond to a number of DNS queries that exceeds agreed upon service levels. In one aspect, the multiple DNS queries may be directed to a specific assigned network address for the content provider 104. In another aspect, the multiple DNS queries may be directed to all the specific assigned network addresses for the content provider 104. Still further, in another aspect, the multiple DNS queries may not be targeted only to a specific content provider domain and may indicative of a larger, network based attack. One skilled in the relevant art will appreciate that the association of the DNS queries may also be determined by criteria other than the number of DNS queries, such as by the source of the DNS query (e.g., from a known bad actor or IP address) or based on signature mapping of the DNS query (e.g., known identification information in the DNS query).

At block 706, the service provider 106 determines network address attributes of the DNS queries that have exceeded the threshold (e.g., the "DNS query attack"). In one aspect, the service provider 106 may identify all the specific network addresses that have been targeted. In another aspect, the service provider 106 may determine a percentage of targeted network addresses to attempt to block or filter. At decision block 708, a test is conducted to determine whether to filter the received DNS queries. As previously described, the service provider 106 may attempt to filter all DNS queries to a particular network address if only a portion of the network addresses associated with a content provider are targeted or based on a determination that the service provider request routing services would be compromised. In another example, if multiple network addresses are targeted the service provider 106 may determine to filter a percentage of the network address to maintain some request routing functionality on behalf of the content provider 104.

If the service provider 106 determines to filter the DNS queries, at block 710, the service provider filters, or otherwise blocks, the DNS queries. In one embodiment, the service provider 106 may utilize a communication or routing protocol to cause network-based equipment, such as routers, to filter all DNS queries corresponding to an identified IP address prior to being received by the service provider. As previously described, an example of such a routing protocol would be the utilization of null route injection command/ information. In another embodiment, the service provider 106 can filter the DNS queries as they are received by the service provider network. For example, the service provider can utilize router access control lists that can be configured to block requests to specific network addresses as the requests are received by the routers. Alternatively, if the service provider 106 determines not to filter, the service provider, through a receiving DNS server component, processes the received DNS query. As previously described, the service provider can configure specific hardware computing devices to be responsive to any non-blocked network addresses. In a further embodiment, the service provider 106 can also direct DNS queries targeted to one or more assigned network addresses to specific DNS components within the service provider network. For example, the service provider 106 can forward one or more DNS queries via the communication network, such as a communication tunnel. At block 714, the routine 700 ends.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable medium storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing DNS queries comprising:
    determining, by a service provider, that DNS queries associated with an identifiable domain exceed a threshold number of DNS queries that can be processed by a service provider; and
    causing, by the service provider, filtering of a portion of the DNS queries, wherein the filtering of the portion of the DNS queries is based on selection of a portion of assigned network addresses for a DNS server authoritative for the identified domain, wherein the assigned network addresses for a DNS server authoritative for the identified domain are selected from a divisible range of available service provider network addresses corresponding to a plurality of network address zones.

2. The computer-implemented method as recited in claim 1 further comprising determining not to filter a different portion of the DNS queries.

3. The computer-implemented method as recited in claim 2, wherein determining not to filter a different portion of the DNS queries is based on selection of different assigned network addresses for the DNS server authoritative for the identified domain.

4. The computer-implemented method as recited in claim 1, wherein causing the filtering of a portion of the DNS queries is further based on a percentage of DNS queries allowed to be processed.

5. The computer-implemented method as recited in claim 1, wherein each network address zone is defined according to a division of available network addresses for service provider DNS servers.

6. The computer-implemented method as recited in claim 1 further comprising:
    obtaining, by the service provider, one or more additional DNS queries, the additional DNS queries corresponding to the identifiable domain;
    associate the one or more additional DNS queries with the determined DNS queries exceeding the threshold number of DNS queries that can be processed by the service provider; and
    determine not to filter the one or more additional DNS queries.

7. The computer-implemented method as recited in claim 6, wherein the one or more additional DNS queries correspond to a different assigned network address.

8. A system comprising:
    a DNS query processor, at a service provider, coupled to memory and operative to:
    determine that DNS queries associated with an identifiable domain exceed a threshold number of DNS queries that can be processed by a service provider; and cause filtering of a portion of the DNS queries, wherein the filtering of the portion of the DNS queries is based on selection of a portion of assigned network addresses for a DNS server authoritative for the identified domain, wherein the assigned network addresses for a DNS server authoritative for the identified domain are selected from a divisible range of available service provider network addresses corresponding to a plurality of network address zones.

9. The system as recited in claim 8, wherein the DNS query processor is further operative to determine not to filter a different portion of the DNS queries.

10. The system as recited in claim 9, wherein determining not to filter a different portion of the DNS queries is based on selection of different assigned network addresses for the DNS server authoritative for the identified domain.

* * * * *